US009715235B2

(12) United States Patent
McGrew et al.

(10) Patent No.: US 9,715,235 B2
(45) Date of Patent: Jul. 25, 2017

(54) AUTONOMOUS UNMANNED AERIAL VEHICLE DECISION-MAKING

(71) Applicant: The Boeing Company, Chicago, IL (US)

(72) Inventors: James Statelar McGrew, White Salmon, WA (US); John Lyle Vian, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/732,409

(22) Filed: Jun. 5, 2015

(65) Prior Publication Data
US 2016/0357192 A1  Dec. 8, 2016

(51) Int. Cl.
| | | |
|---|---|---|
| *G01D 1/10* | (2006.01) | |
| *B64C 39/02* | (2006.01) | |
| *B64D 47/08* | (2006.01) | |
| *G05D 1/00* | (2006.01) | |
| *G05D 1/10* | (2006.01) | |

(52) U.S. Cl.
CPC .......... *G05D 1/101* (2013.01); *B64C 39/024* (2013.01); *B64D 47/08* (2013.01); *G05D 1/0022* (2013.01); *G05D 1/0044* (2013.01); *G05D 1/0088* (2013.01); *G05D 1/0094* (2013.01); *B64C 2201/141* (2013.01); *B64C 2201/146* (2013.01)

(58) Field of Classification Search
CPC .... G05D 1/101; G05D 1/0088; G05D 1/0094; G05D 1/0044; G05D 1/0022; B64C 39/024; B64C 2201/141; B64C 2201/146; B64D 47/08

USPC ......................................................... 701/14
See application file for complete search history.

(56) References Cited

U.S. PATENT DOCUMENTS

| | | | |
|---|---|---|---|
| 2006/0106506 A1 | 5/2006 | Nichols et al. | |
| 2007/0093945 A1* | 4/2007 | Grzywna | ............... G05D 1/101 701/23 |
| 2011/0184604 A1 | 7/2011 | Franke et al. | |
| 2014/0074339 A1 | 3/2014 | Casado et al. | |
| 2014/0142785 A1 | 5/2014 | Fuentes et al. | |
| 2015/0336671 A1* | 11/2015 | Winn | ................... B64C 39/024 701/3 |

OTHER PUBLICATIONS

Extended European Search Report, dated Dec. 23, 2016, regarding Application No. EP16160403.8, 7 pages.

* cited by examiner

*Primary Examiner* — Brian P Sweeney
(74) *Attorney, Agent, or Firm* — Yee & Associates, P.C.

(57) ABSTRACT

A method and apparatus for autonomously managing operation of an unmanned aerial vehicle. Sensor data is received by a computer system located onboard the unmanned aerial vehicle. The sensor data is processed by the computer system to generate information of interest related to at least one target, while the unmanned aerial vehicle is out of a communications range of a control station. A number of actions to be performed is identified by the computer system based on the information of interest related to the at least one target, while the unmanned aerial vehicle is out of the communications range of the control station.

18 Claims, 11 Drawing Sheets

AUTONOMOUS UNMANNED AERIAL VEHICLE DECISION-MAKING

BACKGROUND INFORMATION

1. Field

The present disclosure relates generally to unmanned aerial vehicles and, in particular, to autonomously operating unmanned aerial vehicles. Still more particularly, the present disclosure relates to a method and apparatus for autonomously performing decision-making onboard an unmanned aerial vehicle to complete a mission.

2. Background

Typically, an unmanned aerial vehicle is operated remotely by a pilot located at a control station. This control station may be located on ground or onboard a different manned aerial vehicle. In some cases, the control station may be located onboard a water vehicle, such as a ship or submarine.

Unmanned aerial vehicles are used to perform different types of missions, including, but not limited to, intelligence, surveillance, and reconnaissance (ISR) missions. For example, an unmanned aerial vehicle may be remotely operated from a control station and flown into a particular environment. An imaging system attached to the unmanned aerial vehicle may be used to generate raw imaging data for this environment. This raw imaging data is transmitted to the control station for interpretation and analysis by one or more persons at the control station, who then may decide the appropriate course of action. In this manner, perception and interpretation of the environment, as well as decision-making, may be performed by the one or more persons at the control station.

However, operation of the unmanned aerial vehicle may be constrained by the maximum range for communications between the unmanned aerial vehicle and the control station. As one example, some communications systems onboard an unmanned aerial vehicle may require that the unmanned aerial vehicle be within about 50 miles of the control station. Further, some communications systems onboard an unmanned aerial vehicle may require a direct line of sight between the unmanned aerial vehicle and the control station.

This communications range requirement for the unmanned aerial vehicle may constrain the types of missions that may be performed by the unmanned aerial vehicle. Therefore, it would be desirable to have a method and apparatus that take into account at least some of the issues discussed above, as well as other possible issues.

SUMMARY

In one illustrative embodiment, a method is provided. Sensor data is received by a computer system located onboard an unmanned aerial vehicle. The sensor data is processed by the computer system to generate information of interest related to at least one target, while the unmanned aerial vehicle is outside a communications range of a control station. A number of actions is identified by the computer system to be performed based on the information of interest related to the at least one target, while the unmanned aerial vehicle is outside the communications range of the control station.

In another illustrative embodiment, a method for autonomously managing operation of an unmanned aerial vehicle is provided. Information related to at least one target is received by a computer system located onboard the unmanned aerial vehicle. The information is based on data that is received from at least one of a sensor system, a target detector, a target tracker, or a number of vehicle systems implemented onboard the unmanned aerial vehicle. The operation of the unmanned aerial vehicle and a performance of a mission of the unmanned aerial vehicle using the information, while the unmanned aerial vehicle is outside a communications range of a control station, is evaluated by the computer system autonomously. A number of actions to be performed are identified, by the computer system autonomously, based on evaluation of the operation of and the performance of the mission of the unmanned aerial vehicle, while the unmanned aerial vehicle is outside the communications range of the control station.

In another yet illustrative embodiment, an apparatus comprises a sensor system and a computer system. The sensor system is located onboard an unmanned aerial vehicle and generates sensor data. The computer system is located onboard the unmanned aerial vehicle. The computer system receives the sensor data, processes the sensor data to generate information of interest related to at least one target, and identifies a number of actions to be performed based on the information of interest related to the at least one target, while the unmanned aerial vehicle is located outside a communications range of a control station.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method for autonomously operating an unmanned aerial vehicle such that decision-making that is traditionally performed by one or more persons at a control station located remotely from the unmanned aerial vehicle may be moved onboard the unmanned aerial vehicle. In particular, the illustrative embodiments recognize and take into account that it may be desirable to autonomously perform interpretation of imaging data and decision-making onboard an unmanned aerial vehicle when the unmanned aerial vehicle is outside a communications range with the control station.

This type of autonomous operation of the unmanned aerial vehicle may improve reaction times and mission performance. Further, by moving these operations onboard the unmanned aerial vehicle, the burden placed on personnel at the control station may be reduced and cost savings may be achieved.

The illustrative embodiments also recognize and take into account that the capability of an unmanned aerial vehicle to autonomously operate when outside a communications range may enable the unmanned aerial vehicle to perform tasks in communications-degraded or communications-denied environments. Thus, the illustrative embodiments provide a method and apparatus for autonomously performing decision-making onboard an unmanned aerial vehicle to complete a mission even when the unmanned aerial vehicle is outside a communications range with a control station.

Figure 1:
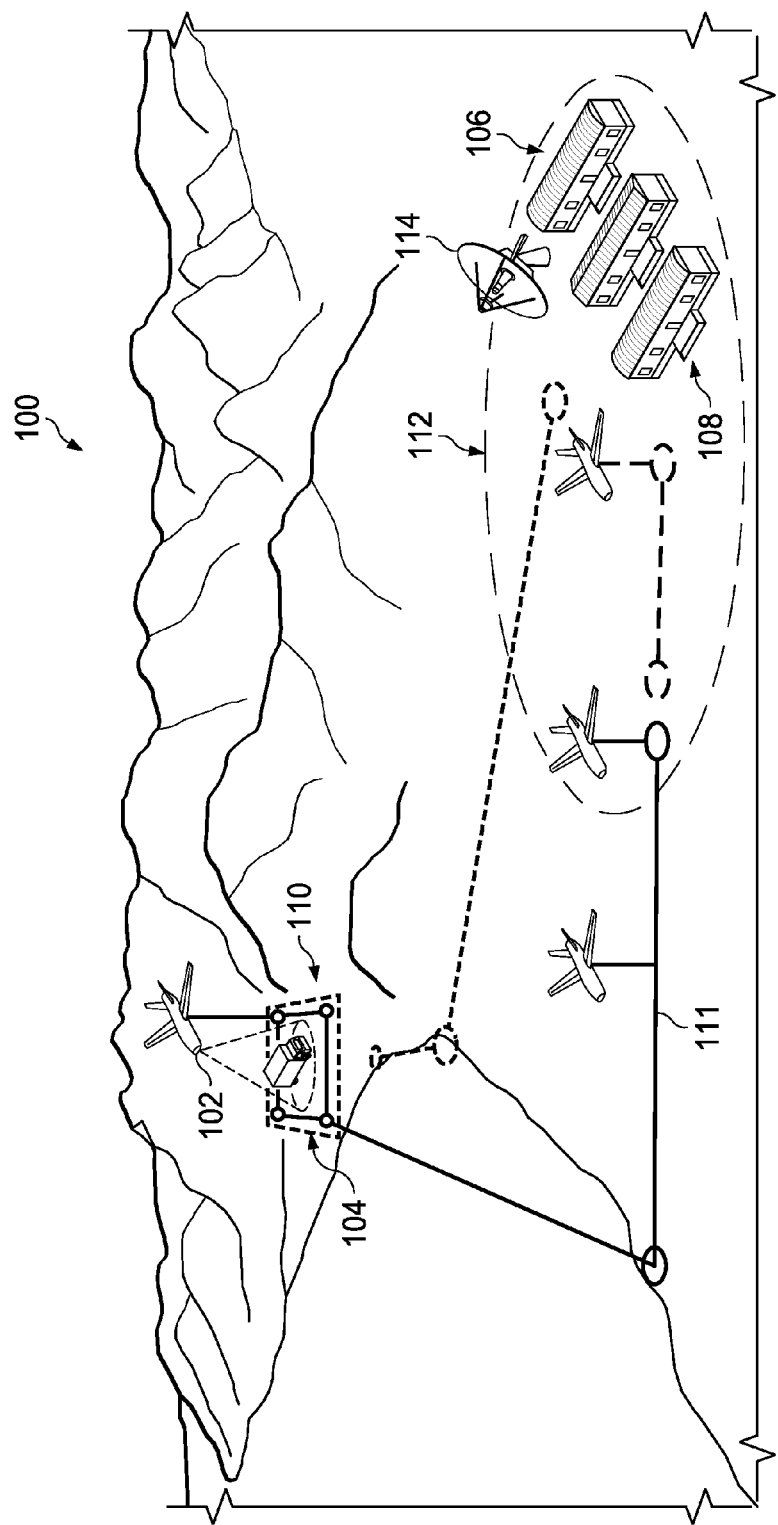
FIG. 1 is an illustration of an environment in accordance with an illustrative embodiment.

Referring now to the figures and, in particular, with reference to FIG. 1, an illustration of an environment is depicted in accordance with an illustrative embodiment. In environment 100, unmanned aerial vehicle 102 may be used to perform a mission. In this illustrative example, unmanned aerial vehicle 102 is performing intelligence, surveillance, and reconnaissance for area of interest 104.

Control station 106 may be located remotely with respect to unmanned aerial vehicle 102. In this illustrative example, control station 106 is at first location 108 and unmanned aerial vehicle 102 is at second location 110. Unmanned aerial vehicle 102 flies from control station 106 to second location 110 along flight path 111.

Second location 110 of unmanned aerial vehicle 102 may be outside communications range 112 of first location 108 of control station 106. In particular, unmanned aerial vehicle 102 may be outside communications range 112 of communications system 114 at control station 106. However, unmanned aerial vehicle 102 may be configured to autonomously perform processing of data and decision-making based on this processing when outside communications range 112.

Figure 2:
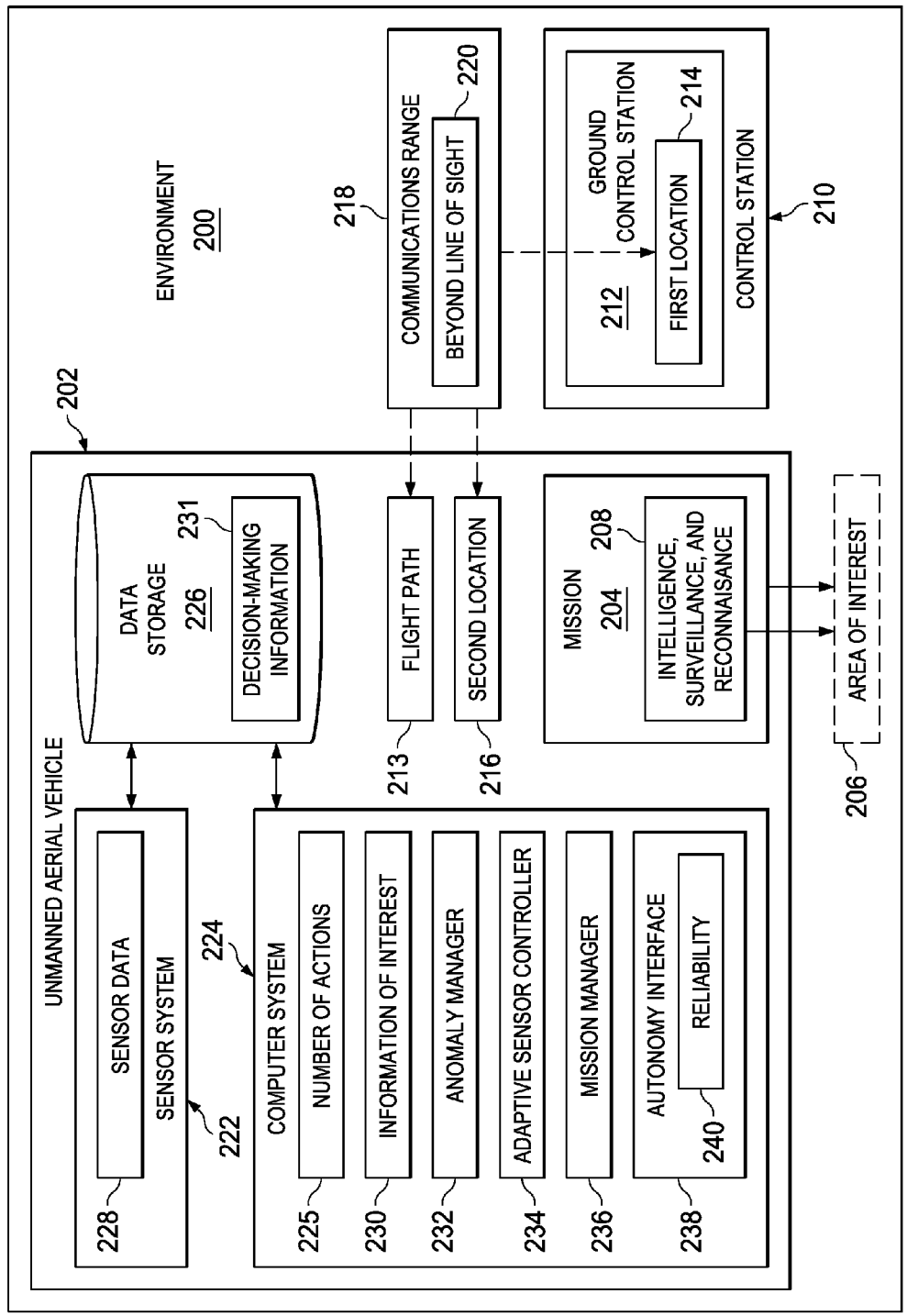
FIG. 2 is an illustration of an environment in the form of a block diagram in accordance with an illustrative embodiment.

With reference now to FIG. 2, an illustration of an environment is depicted in the form of a block diagram in accordance with an illustrative embodiment. In this illustrative example, environment 200 includes unmanned aerial vehicle 202. Environment 100 and unmanned aerial vehicle 102 in FIG. 1 may be examples of implementations for environment 200 and unmanned aerial vehicle 202, respectively.

Unmanned aerial vehicle 202 is used to perform mission 204 with respect to area of interest 206. In one illustrative example, mission 204 includes intelligence, surveillance, and reconnaissance (ISR) 208. In some illustrative examples, mission 204 may include performing other types of tasks.

As depicted, control station 210 may also be present within environment 200. Control station 210 may be located on ground, onboard another aerial vehicle, onboard a water vehicle, onboard a ground vehicle, or on some other type of platform. In this illustrative example, control station 210 takes the form of ground control station 212.

Unmanned aerial vehicle 202 may fly along flight path 213 to perform mission 204 over area of interest 206. For example, control station 210 may be located at first location 214. Area of interest 206 may be at second location 216. Flight path 213 for unmanned aerial vehicle 202 may include flying from control station 210 to area of interest 206 and back to control station 210.

Any number of points along flight path 213 may be outside a maximum communications range of control station 210. As one illustrative example, second location 216 of area of interest 206 may be outside communications range 218 of control station 210. Communications range 218 of control station 210 may be the maximum distance from control station 210 at which a vehicle, such as unmanned aerial vehicle 202, may communicate with control station 210 to exchange data with control station 210. In some illustrative examples, communications range 218 may be substantially the same at all angles relative to control station 210. However, in other illustrative examples, communications range 218 may vary at different angles relative to control station 210. In some cases, being outside communications range 218 may also be referred to as being beyond line of sight 220.

Unmanned aerial vehicle 202 may be capable of operating autonomously even when unmanned aerial vehicle 202 is outside communications range 218. As depicted, unmanned aerial vehicle 202 may include sensor system 222, computer system 224, and data storage 226 onboard unmanned aerial vehicle 202. Sensor system 222 may generate sensor data 228. In some cases, this sensor data 228 may be stored in data storage 226.

Data storage 226 may be implemented as part of or separate from computer system 224, depending on the implementation. Data storage 226 may include, for example, without limitation, a number of databases, memory, other types of data structures or storage devices, or some combination thereof.

Computer system 224 may process sensor data 228 to generate information of interest 230. In one illustrative example, information of interest 230 may be related to at least one target that is of interest. Information of interest 230 may be related to at least one target in many different ways. For example, without limitation, information of interest 230 may include at least one of information about a target of interest, information related to the search pattern to be used to detect a target of interest, information related to the flight path to be used to detect and track a target of interest, information about how data generated about a target of interest will be communicated to control station 210 or another unmanned aerial vehicle or a different type of aerial vehicle, or some other type of information.

Computer system 224 may then identify number of actions 225 to be performed based on information of interest 230. When information of interest 230 is related to at least one target, number of actions 225 identified may also be related to the at least one target.

Computer system 224 may process sensor data 228 using decision-making information 231, which may also be stored in data storage 226. Decision-making information 231 may include, for example, without limitation, a plurality of rules, a plurality of instructions, safety requirements, information about no-fly zones, terrain maps, or other types of information.

In some cases, decision-making information 231 may include a set of preselected options from which number of actions 225 may be selected. In one illustrative example, the set of preselected options may be received from control station 210 prior to unmanned aerial vehicle 202 going outside communications range 218 of control station 210.

At least one of anomaly manager 232, adaptive sensor controller 234, mission manager 236, and autonomy interface 238 may be implemented on computer system 224. As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

Each of anomaly manager 232, adaptive sensor controller 234, mission manager 236, and autonomy interface 238 may be implemented on computer system 224 and may be implemented using hardware, software, firmware, or a combination thereof. When software is used, operations may be may be implemented using, for example, without limitation, program code configured to run on a processor unit. When firmware is used, the operations performed may be implemented using, for example, without limitation, program code and data and stored in persistent memory to run on a processor unit.

When hardware is employed, the hardware may include one or more circuits that operate to perform operations. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

Autonomy interface 238 may be used to check for reliability 240. Depending on the implementation, autonomy interface 238 may be implemented independently or as part of mission manager 236.

Figure 3:
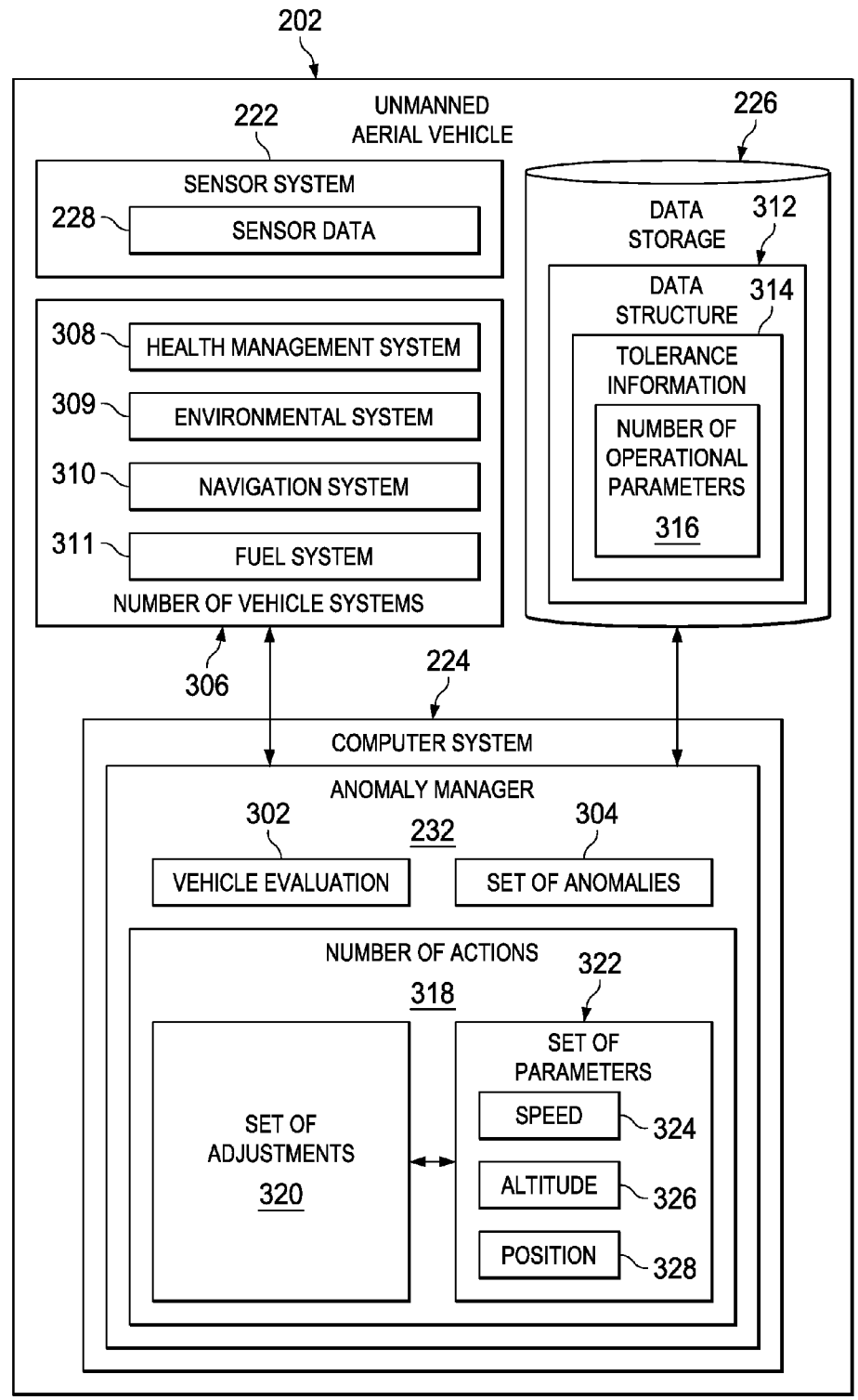
FIG. 3 is an illustration of an anomaly manager of an unmanned aerial vehicle in greater detail in the form of a block diagram in accordance with an illustrative embodiment.

With reference now to FIG. 3, an illustration of anomaly manager 232 of unmanned aerial vehicle 202 from FIG. 2 is depicted in greater detail in the form of a block diagram in accordance with an illustrative embodiment. As depicted, anomaly manager 232 may perform vehicle evaluation 302 to identify set of anomalies 304.

As one illustrative example, anomaly manager 232 may receive data form number of vehicle systems 306. As used herein, a "number of" items may include one or more items. In this manner, number of vehicle systems 306 may include one or more vehicle systems.

In this illustrative examples, number of vehicle systems 306 may include, for example, without limitation, at least one of health management system 308, environmental system 309, navigation system 310, fuel system 311, some other type of vehicle system, or some combination thereof. Anomaly manager 232 receives data from number of vehicle systems 306 and processes this data to perform vehicle evaluation 302.

Anomaly manager 232 may determine whether any anomalies are present. As used herein, an anomaly may be, for example, an operational or system parameter for unmanned aerial vehicle 202 being outside of selected tolerances.

In one illustrative example, data structure 312 in data storage 226 may store tolerance information 314 for number of operational parameters 316. Tolerance information 314 may include, for example, without limitation, tolerances or thresholds for each of number of operational parameters 316. Number of operational parameters 316 may include, for example, without limitation, at least one of an altitude, a position, a weight, fuel remaining, a speed, a number of engine parameters, a number of environmental parameters, or some other type of operation parameter.

Anomaly manager 232 performs vehicle evaluation 302 using tolerance information 314 to identify any anomalies. When set of anomalies 304 is identified, anomaly manager 232 then identifies number of actions 318 to be performed. Number of actions 318 may include, for example, without limitation, performing set of adjustments 320 for set of parameters 322. Set of parameters 322 may include, but is not limited to, speed 324, altitude 326, position 328, and other types of parameters. In some cases, number of actions 318 may include stopping mission 204 and returning to control station 210 in FIG. 2.

As one illustrative example, anomaly manager 232 may detect an engine temperature that is above a maximum threshold as an anomaly and added to set of anomalies 304 detected. Anomaly manager 232 may identify actions to be taken in response to the high engine temperature, which may include, for example, reducing speed 324 and reducing altitude 326.

As another illustrative example, performing vehicle evaluation 302 may include evaluating fuel system 311 with respect to fuel quantity and fuel flow rate. For example, without limitation, a fuel reserve that is below a minimum threshold may be detected as an anomaly and added to set of anomalies 304 detected. Anomaly manager 232 may identify actions to be taken in response to the low fuel reserve, which may include, for example, discontinuing the mission and returning to base.

Figure 4:
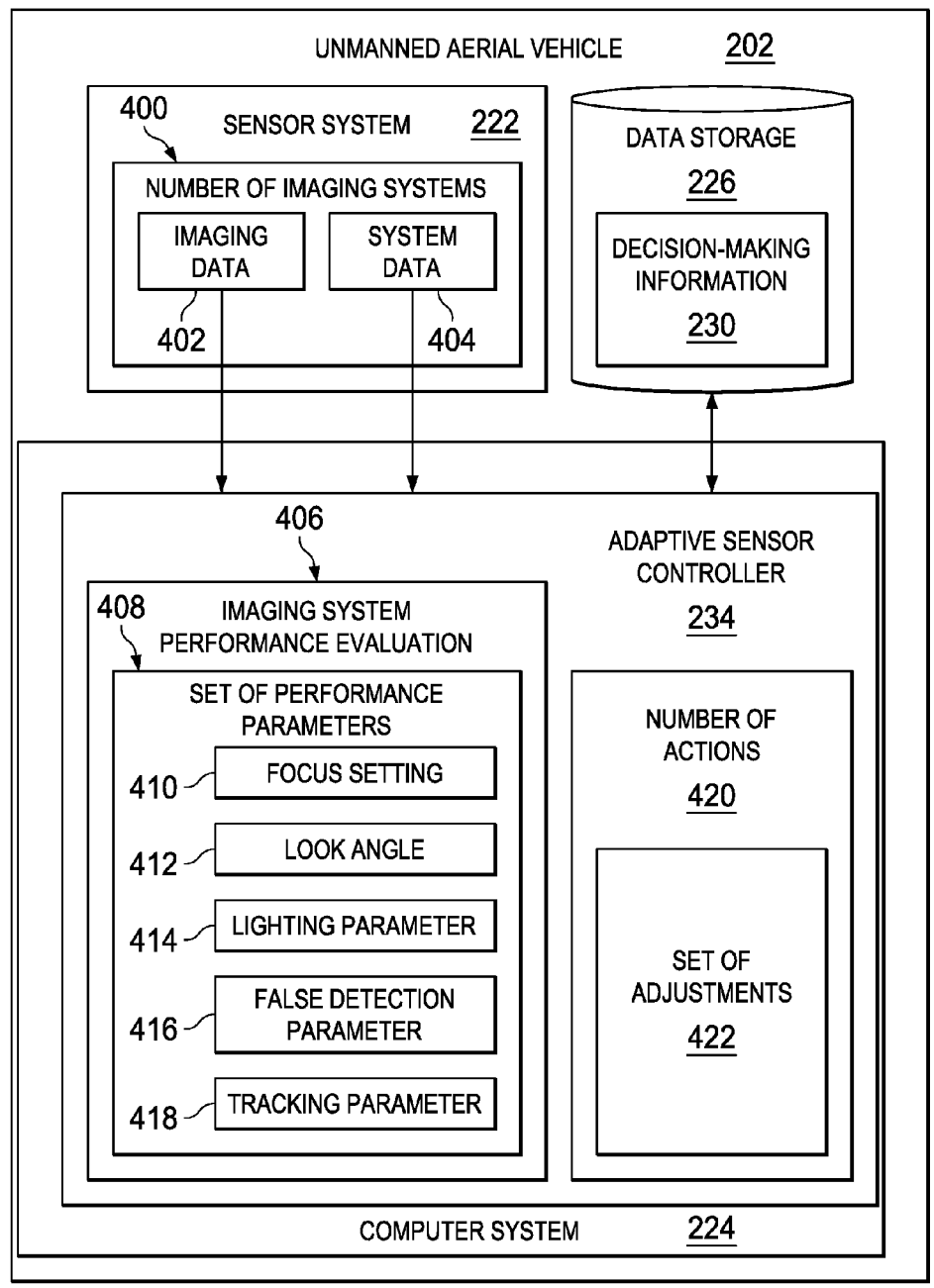
FIG. 4 is an illustration of an adaptive sensor controller of an unmanned aerial vehicle in greater detail in the form of a block diagram in accordance with an illustrative embodiment.

With reference now to FIG. 4, an illustration of adaptive sensor controller 234 of unmanned aerial vehicle 202 from FIG. 2 is depicted in greater detail in the form of a block diagram in accordance with an illustrative embodiment. Adaptive sensor controller 234 may be used to control, for example, without limitation, number of imaging systems 400 in sensor system 222.

Number of imaging systems 400 may be used to perform, for example, without limitation, target detection. In some cases, number of imaging systems 400 may also be used to perform target tracking.

Number of imaging systems 400 may generate imaging data 402 and system data 404. Imaging data 402 may include, for example, without limitation, still images, video, or both. Further, imaging data 402 may include, for example, without limitation, at least one of electro-optical imaging data, infrared imaging data, radar imaging data, or some other type of imaging data.

System data 404 may include data about the operation of number of imaging systems 400. For example, without limitation, system data 404 may include at least one of an orientation for an imaging system in number of imaging systems 400, a look angle for an imaging system in number of imaging systems 400, a focus setting for an imaging system in number of imaging systems 400, or some other type of system data.

Adaptive sensor controller 234 may receive and process imaging data 402 and system data 404 to perform imaging system performance evaluation 406. As one illustrative example, adaptive sensor controller 234 may perform imaging system performance evaluation 406 by evaluating set of performance parameters 408 for each of number of imaging systems 400. Set of performance parameters 408 may include, but are not limited to, at least one of focus setting 410, look angle 412, lighting parameter 414, false detection parameter 416, tracking parameter 418, or some other type of performance parameter.

Adaptive sensor controller 234 may identify number of actions 420 to be performed based on imaging system performance evaluation 406. Number of actions 420 may include set of adjustments 422. Set of adjustments 422 may include at least one adjustment for at least one performance parameter for at least one of number of imaging systems 400. In some cases, an adjustment in set of adjustments 422 may be a zoom change, an aperture setting change, a detection sensitivity change, or some other type of adjustment.

Figure 5:
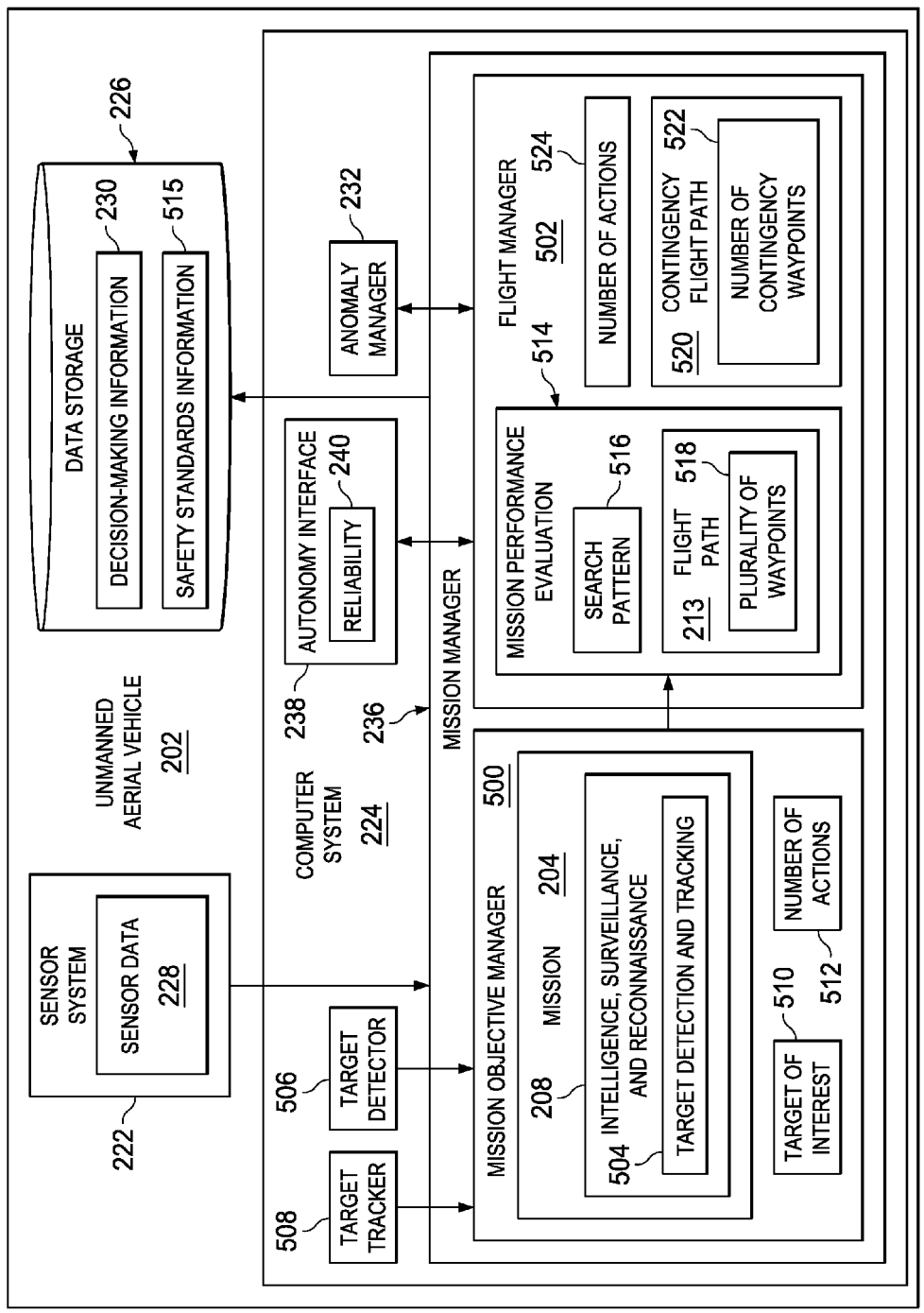
FIG. 5 is an illustration of a mission manager of an unmanned aerial vehicle in greater detail in the form of a block diagram in accordance with an illustrative embodiment.

With reference now to FIG. 5, an illustration of mission manager 236 of unmanned aerial vehicle 202 from FIG. 2 is depicted in greater detail in the form of a block diagram in accordance with an illustrative embodiment. Mission manager 236 may include, for example, mission objective manager 500 and flight manager 502.

Mission objective manager 500 may be used to ensure that unmanned aerial vehicle 202 stays on mission 204. For example, intelligence, surveillance, and reconnaissance 208 may include performing target detection and tracking 504. Target detection and tracking 504 may be performed using target detector 506 and target tracker 508. Target detector 506 and target tracker 508 may be used to perform target detection and tracking 504 based on, for example, imaging data 402 in FIG. 4.

In some cases, the objective of mission 204 may be to detect and track a particular target of interest 510. Target detector 506 and target tracker 508 may perform this detection and tracking, respectively, by processing sensor data 228 using, for example, without limitation, at least one of image edge detection, object recognition, object motion detection, object shape detection, object color recognition, or some other type of detection process, tracking process, or combination thereof.

Sensor data 228 may be generated by sensor system 222 that may be implemented in many different ways. Sensor system 222 may include, for example, without limitation, at least one of a visible light sensor, an infrared sensor, an electro-optical sensor, a laser, an ultraviolet sensor, a radar system, an ultrasonic imaging system, a sensor system capable of detecting one or more different bandwidths of electromagnetic radiation, a sensor system capable of detecting sound, or some other type of sensor.

Mission objective manager 500 may monitor target detector 506 and target tracker 508 to ensure that any target that has been detected and is being tracked is indeed target of interest 510. In some cases, based on this monitoring, mission objective manager 500 may identify number of actions 512 to be performed. An action in number of actions 512 may take the form of, for example, without limitation, flying unmanned aerial vehicle 202 closer to target of interest 510, orbiting around target of interest 510, storing information about target of interest 510 for future transmission to control station 210, or some other type of action.

In some cases, an action in number of actions 512 may include re-planning at least a portion of mission 204. For example, without limitation, if target detector 506 has been unable to detect target of interest 510 for at least a selected period of time, mission objective manager 500 may generate a new search area, a new search pattern, or some other type of new instruction.

Flight manager 502 may be used to manage flight path 213 of unmanned aerial vehicle 202. For example, during flight, mission performance evaluation 514 may be performed to monitor performance of mission 204. Depending on the implementation, mission objective manager 500, flight manager 502, or both may perform mission performance evaluation 514.

Mission performance evaluation 514 may be based on search pattern 516 and plurality of waypoints 518 for flight path 213. As one illustrative example, flight manager 502 may use safety standards information 515 to determine whether the current search pattern 516, plurality of waypoints 518, or both are unsafe or will cause undesired anomalies. Flight manager 502 may also use information about the terrain, information about no-fly zones, information about the dynamics of unmanned aerial vehicle 202, and other types of information to evaluate search pattern 516 and flight path 213.

In some cases, flight manager 502 may determine that contingency flight path 520 needs to be generated. Flight manager 502 identifies number of contingency waypoints 522 for contingency flight path 520. Number of contingency waypoints 522 may replace one or more of plurality of waypoints 518 along the original flight path 213.

Depending on the implementation, flight manager 502 may use information provided by at least one of anomaly manager 232 or autonomy interface 238 to determine whether contingency flight path 520 is needed. For example, in response to the detection of a particular type of anomaly by anomaly manager 232, contingency flight path 520 may be needed. As one illustrative example, the detection of a fuel reserve that is below a minimum threshold by anomaly manager 232 may alert flight manager 502 that contingency flight path 520 is needed.

Autonomy interface 238 may be used to ensure that plurality of waypoints 518 of flight path 213 and number of contingency waypoints 522, if needed, meet selected standards for reliability 240 and safety requirements. As one illustrative example, autonomy interface 238 may monitor flight path 213, contingency flight path 520 if generated, and number of actions 524 to ensure that waypoints and action commands are generated or updated within a specified time period. If, for example, an update does not fall within the specified time period, autonomy interface 238 may provide one or more contingency waypoints, one or more action commands, or both that are known to be safe and reliable. In this manner, undesired behavior with respect to the generation of and updating of waypoints and action commands may be prevented. In some cases, newly generated or updated waypoints may be monitored to ensure that these waypoints are substantially continuous to within a specified distance interval, meet specified geometric constraints such as turn radius, and are located within specified flight areas.

Flight manager 502 may also identify number of actions 524 to be performed. An action in number of actions 524 may include invoking contingency flight path 520, orbiting in place, stopping and returning to control station 210 in FIG. 2, or some other type of action.

Thus, the various components of computer system 224 of unmanned aerial vehicle 202, as described in FIGS. 2-5, provide the capability for unmanned aerial vehicle 202 to operate autonomously and identify actions to be performed even when unmanned aerial vehicle 202 is outside communications range 218. For example, without limitation, computer system 224 of unmanned aerial vehicle 202 may autonomously generate information of interest 230 that is related to at least one target. Computer system 224 may then use a plurality of rules included in decision-making information 231 stored in data storage 226 to identify number of actions 225 that are to be performed based on information of interest 230. Number of actions 225 may also be considered related to the at least one target.

As one illustrative example, computer system 224 may process data received from at least one of sensor system 222, number of vehicle systems 306, target detector 506, or target tracker 508 to identify information of interest 230 related to at least one target of interest. Computer system 224 may identify that a target of interest has been detected and that either the sun is to the back of unmanned aerial vehicle 202 or the target is positioned relative to unmanned aerial vehicle 202. Based on a corresponding rule, computer system 224 may then identify actions to be taken, which may include planning and flying a flight path that approaches the target from a new heading and offset distance that may enable the target to be observed and imaged under different lighting conditions.

In another example, computer system 224 may identify that a target of interest has been detected and the target is suspected of being a mobile target or that the target is moving. Based on another corresponding rule, computer system 224 may identify that unmanned aerial vehicle 202 needs to fly an orbit around the target for a selected period of time to observe any movement of the target or that unmanned aerial vehicle 202 needs to plan and fly a flight path that tracks the moving target for a specified period of time, within a specified area, or both.

In yet another example, computer system 224 may identify that a target of interest has been detected and that a number of pixels in an image representing the target is less than a selected number. Based on a corresponding rule, computer system 224 may determine that a zoom setting on an imaging system needs to be increased and that unmanned aerial vehicle 202 needs to plan and fly a flight path that keeps the target within the zoomed-in field of view of the imaging system.

Another rule may state that if computer system 224 detects a target of interest and a contrast of the target within one or more images becomes degraded or the target becomes occluded, then a visible light imaging system that is being used may need to be switched to an infrared imaging system or an imaging system that captures light of a different range of wavelengths. One rule may state that if computer system 224 detects a target that is considered a high-value target and unmanned aerial vehicle 202 is outside communications range 218, then unmanned aerial vehicle 202 may need to transmit imaging data 402 using satellite communications.

In some illustrative examples, a rule may indicate that if computer system 224 identifies a target that is a noise-sensitive object, then unmanned aerial vehicle 202 may need to plan and fly a flight path that approaches the noise-sensitive object at a lower altitude and with the engine system of unmanned aerial vehicle 202 at a reduced power setting. In one illustrative example, a rule may indicate that if a target of a specified type has been detected, unmanned aerial vehicle 202 is to play and fly multiple flight paths to increase an accuracy of a determination of the location of the target.

In another illustrative example, a rule may state that if a moving target of a specified type is detected, unmanned aerial vehicle 202 is to decrease a zoom setting on an imaging system such that the environment around the target may be captures. For example, depending on the type of target, it may be desirable to capture roads, trails, buildings, and other types of features in the environment around the target.

In this manner, different types of information of interest 230 may be autonomously generated by unmanned aerial vehicle 202 even when unmanned aerial vehicle 202 is outside of communications range 218 of control station 210. Further, different types of rules may be stored onboard unmanned aerial vehicle 202 for use in providing a set of preselected options for identifying actions to be taken based on information of interest 230.

Depending on the implementation, unmanned aerial vehicle 202 may subsequently communicate acquired target information and other types of information of interest 230 to control station 210 once unmanned aerial vehicle 202 is inside or within communications range 218 of control station 210. In some cases, unmanned aerial vehicle 202 may communicate acquired target information and other types of information of interest 230 to other unmanned aerial vehicles while unmanned aerial vehicle 202 is outside of communications range 218.

In this manner, a plurality of unmanned aerial vehicles may be capable of acquiring sensor data 228 and processing sensor data 228 to generate information of interest 230 for one target of interest or multiple targets of interest simultaneously even when each of the plurality of unmanned aerial vehicles is outside communications range 218. While a particular unmanned aerial vehicle of the plurality of unmanned aerial vehicles is outside communications range 218, the information of interest 230 and other types of information may be stored for future transmission to control station 210 once the unmanned aerial vehicles enters communications range 218 of control station 210. In some illustrative examples, a selected unmanned aerial vehicle that is outside communications range 218 of control station 210 may be able to transmit information of interest 230 and other types of information to another unmanned aerial vehicle that is within communications range 218 of both the selected unmanned aerial vehicle and the control station 210. In this manner, a communications relay may be created.

In other illustrative example, computer system 224 of unmanned aerial vehicle 202 may enable a plurality of unmanned aerial vehicles, such as a swarm of unmanned aerial vehicles, to operate autonomously while the plurality of unmanned aerial vehicles is in a contested airspace or otherwise restricted airspace outside communications range 218 of control station 210. The plurality of unmanned aerial vehicles may be operated autonomously until the plurality of unmanned aerial vehicles flies within communications range 218 of control station 210. In this manner, the range of control, processing, decision-making, and communications provided by control station 210 for a plurality of autonomous vehicles may be extended beyond the range of control station 210 such that one or more targets of interest in one or more search contested or otherwise restricted areas of interest may be tracked simultaneously.

In particular, computer system 224 enables unmanned aerial vehicle 202 to perform on-vehicle decision-making for responding to system anomalies, on-vehicle adaptive control of sensors to obtain more reliable and higher quality information, on-vehicle interpretation of sensor data to discern actionable information, on-board reasoning and flight guidance to extend range of operation, and on-vehicle verification of guidance waypoints to assure safety.

The illustrations of unmanned aerial vehicle 202 in FIGS. 2-5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some cases, target detector 506 and target tracker 508 may be implemented together as a target detector and tracker. In other illustrative examples, anomaly manager 232 may be implemented within mission manager 236.

Figure 6:
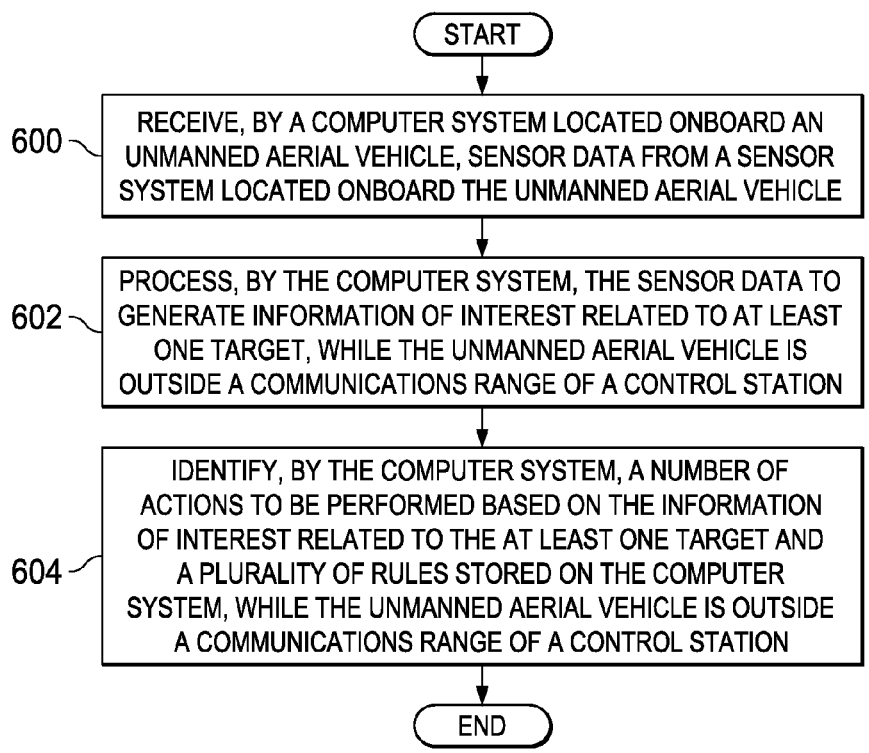
FIG. 6 is an illustration of a process of autonomously operating an unmanned aerial vehicle in the form of a flowchart in accordance with an illustrative embodiment.

With reference now to FIG. 6, an illustration of a process of autonomously operating an unmanned aerial vehicle is depicted in the form of a flowchart in accordance with an illustrative embodiment. The process illustrated in FIG. 6 may be used to operate unmanned aerial vehicle 202 from FIGS. 2-5.

The process begins by receiving, by a computer system located onboard an unmanned aerial vehicle, sensor data from a sensor system located onboard the unmanned aerial vehicle (operation 600). The sensor data is processed, by the computer system, to generate information of interest related to at least one target, while the unmanned aerial vehicle is outside a communications range of a control station (operation 602). The computer system then identifies a number of actions to be performed based on the information of interest related to the at least one target and a plurality of rules stored on the computer system (operation 604), with the process terminating thereafter.

Figure 7:
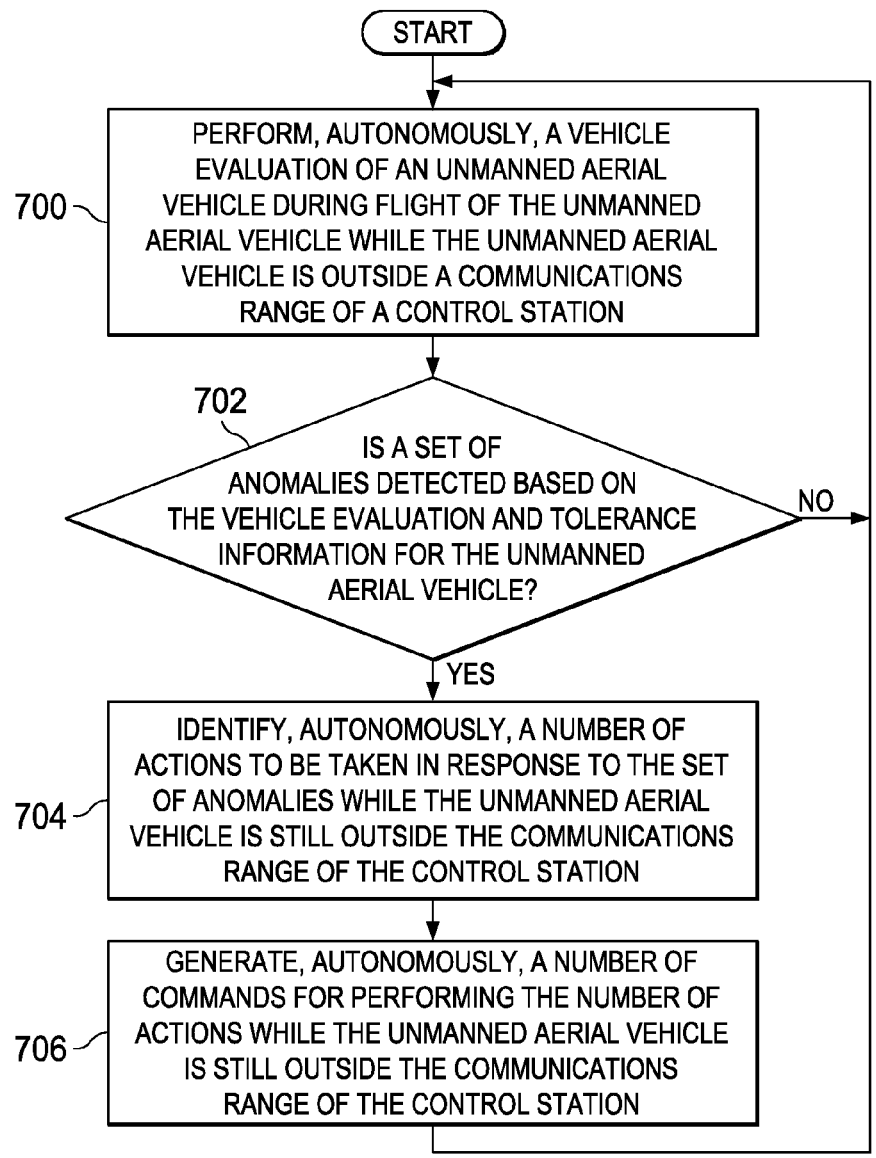
FIG. 7 is an illustration of a process for autonomously detecting a set of anomalies during flight of an unmanned aerial vehicle in the form of a flowchart in accordance with an illustrative embodiment.

With reference now to FIG. 7, an illustration of a process for autonomously detecting a set of anomalies during flight of an unmanned aerial vehicle is depicted in the form of a flowchart in accordance with an illustrative embodiment. The process illustrated in FIG. 7 may be implemented using, for example, computer system 224 described in FIGS. 2-5. In particular, at least a portion of this process may be implemented using anomaly manager 232 described in FIGS. 2, 3, and 5.

The process may begin by autonomously performing a vehicle evaluation of an unmanned aerial vehicle during flight of the unmanned aerial vehicle while the unmanned aerial vehicle is outside communications range of a control station (operation 700). Operation 700 may be performed by evaluating and processing at least one of data received from a number of vehicle systems onboard the unmanned aerial vehicle, sensor data received from a sensor system onboard the unmanned aerial vehicle, or other types of information.

A determination may be made as to whether a set of anomalies is detected based on the vehicle evaluation and tolerance information for the unmanned aerial vehicle (operation 702). If no anomalies are detected, the process returns to operation 700 described above. In some cases, the process may wait for an event to occur before returning to operation 700. For example, the event may be a lapse of a timer, a piece of sensor data receiving a certain value, or some other type of event.

With reference again to operation 702, if a set of anomalies is detected, a number of actions to be taken in response to the set of anomalies is autonomously identified while the unmanned aerial vehicle is still outside the communications range of the control station (operation 704). A number of commands for performing the number of actions may be autonomously generated while the unmanned aerial vehicle is still outside a communications range of the control station (operation 706), with the process then returning to operation 700 as described above. Depending on the implementation, the process may immediately return to operation 700 or wait for an event to occur before returning to operation 700.

In some cases, a command for performing an action may only be transmitted to a corresponding system onboard the unmanned aerial vehicle after one or more selected actions have been performed. Depending on the implementation, a command may be for performing an action after the unmanned aerial vehicle is back within communications range of the control station. For example, a command may be generated for transmitting information of interest about the set of anomalies detected to the control station once the unmanned aerial vehicle is back within communications range of the control station.

Figure 8:
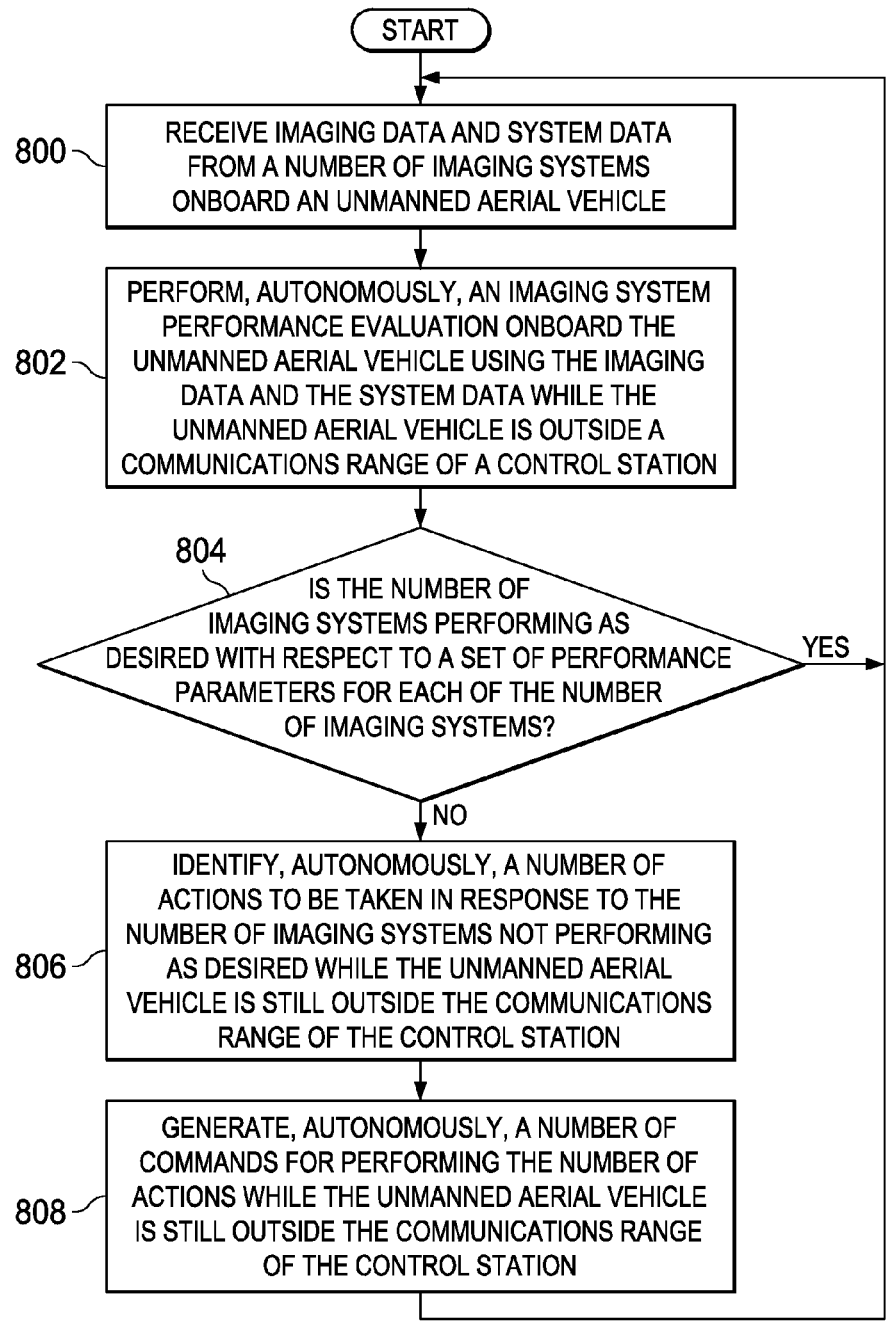
FIG. 8 is an illustration of a process for autonomously performing adaptive sensor control onboard an unmanned aerial vehicle in the form of a flowchart in accordance with an illustrative embodiment.

With reference now to FIG. 8, an illustration of a process for autonomously performing adaptive sensor control onboard an unmanned aerial vehicle is depicted in the form of a flowchart in accordance with an illustrative embodiment. The process illustrated in FIG. 8 may be implemented using, for example, computer system 224 described in FIGS. 2-5. In particular, at least a portion of this process may be implemented using adaptive sensor controller 234 described in FIGS. 2 and 3.

The process may begin by receiving imaging data and system data from a number of imaging systems onboard an unmanned aerial vehicle (operation 800). In operation 800, at least a portion of the imaging data and system data may be generated while the unmanned aerial vehicle is outside a communications range of a control station. The imaging data may include, for example, without limitation, at least one of electro-optical imaging data, infrared imaging data, radar imaging data, or some other type of imaging data. The system data may include, for example, without limitation, at least one of an orientation for an imaging system, a look angle for an imaging system, a focus setting for an imaging system, or some other type of system data.

Next, an imaging system performance evaluation may be autonomously performed onboard the unmanned aerial vehicle using the imaging data and the system data while the unmanned aerial vehicle is outside a communications range of a control station (operation 802). In operation 802, a set of performance parameters may be evaluated for each of the number of imaging systems. The set of performance parameters evaluated for one imaging system may be the same or different than the set of performance parameters evaluated for another imaging system.

A determination may then be made as to whether the number of imaging systems is performing as desired with respect to a set of performance parameters for each of the number of imaging systems (operation 804). If the number of imaging systems is performing as desired, the process returns to operation 800 described above. Otherwise, a number of actions to be taken in response to the number of imaging systems not performing as desired are autonomously identified while the unmanned aerial vehicle is still outside the communications range of the control station (operation 806). A number of commands for performing the number of actions are autonomously generated, while the unmanned aerial vehicle is still outside communications range of the control station (operation 808), with the process then returning to operation 800 described above.

Figure 9:
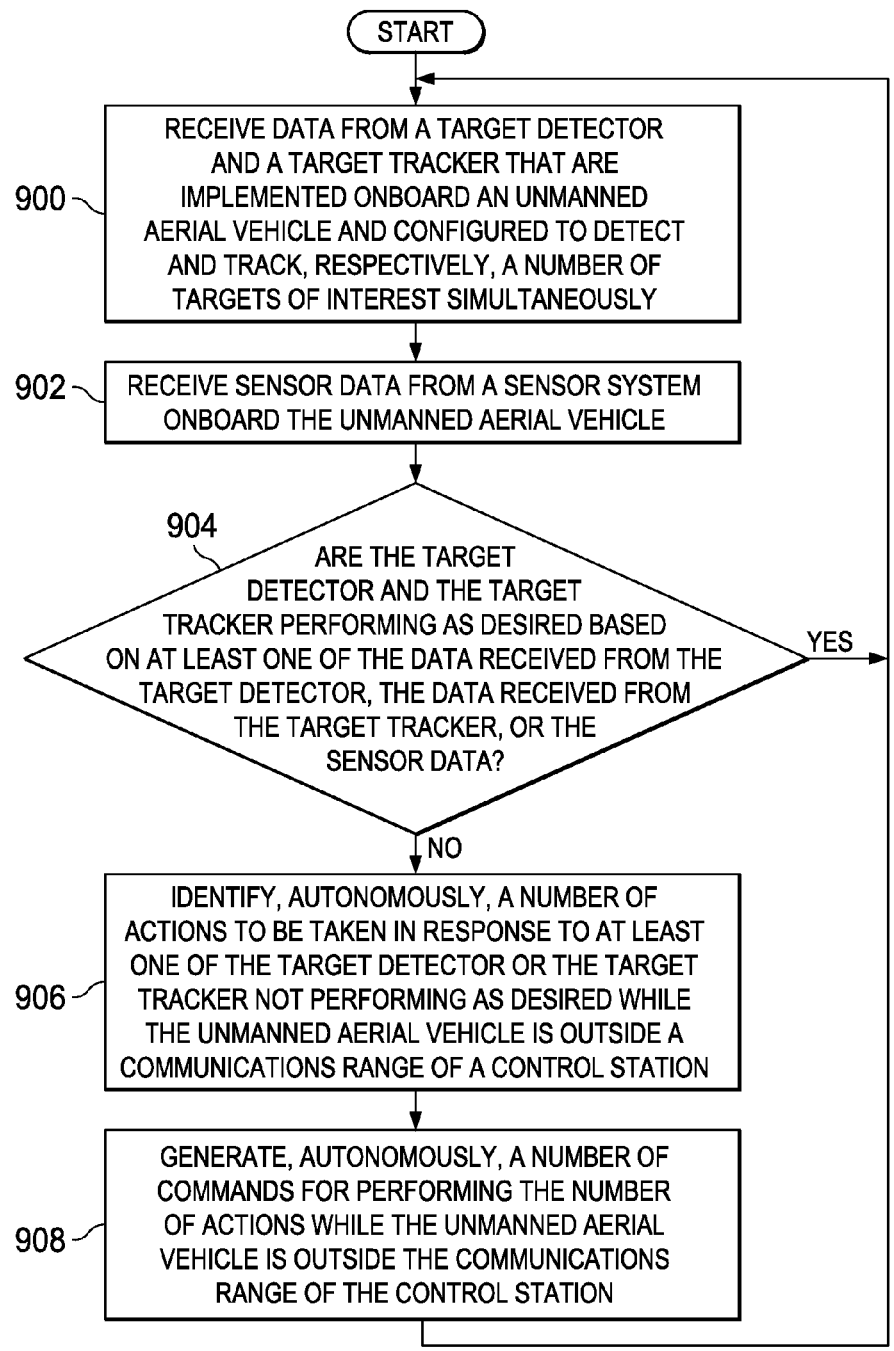
FIG. 9 is an illustration of a process for autonomously managing a mission objective for an unmanned aerial vehicle in the form of a flowchart in accordance with an illustrative embodiment.

With reference now to FIG. 9, an illustration of a process for autonomously managing a mission objective for an unmanned aerial vehicle is depicted in the form of a flowchart in accordance with an illustrative embodiment. The process illustrated in FIG. 9 may be implemented using, for example, computer system 224 described in FIGS. 2-5. In particular, at least a portion of this process may be implemented using mission manager 236 described in FIGS. 2 and 5.

The process may begin by receiving data from a target detector and a target tracker that are implemented onboard an unmanned aerial vehicle and configured to detect and track, respectively, a number of targets of interest simultaneously (operation 900). Sensor data may be received from a sensor system onboard the unmanned aerial vehicle (operation 902). A determination may be made as to whether the target detector and the target tracker are performing as desired based on at least one of the data received from the target detector, the data received from the target tracker, or the sensor data (operation 904). Operation 904 may be performed while the unmanned aerial vehicle is still outside a communications range of a control station.

For example, without limitation, in operation 904, the target detector and the target tracker may be considered operating as desired when the targets being detected and tracked are indeed targets of interest. In other words, operation 904 may be performed to determine whether the target detector and target tracker are operating with a desired level of accuracy and efficacy.

With reference to operation 904, if the target detector and the target tracker are performing as desired, the process returns to operation 900 described above. Otherwise, if at least one of the target detector or the target tracker is not performing as desired, a number of actions to be taken in response to at least one of the target detector or the target tracker is not performing as desired are autonomously identified while the unmanned aerial vehicle is outside a communications range of a control station (operation 906). A number of commands for performing the number of actions are autonomously generated while the unmanned aerial vehicle is outside the communications range of the control station (operation 908), with the process then returning to operation 900 described above.

Figure 10:
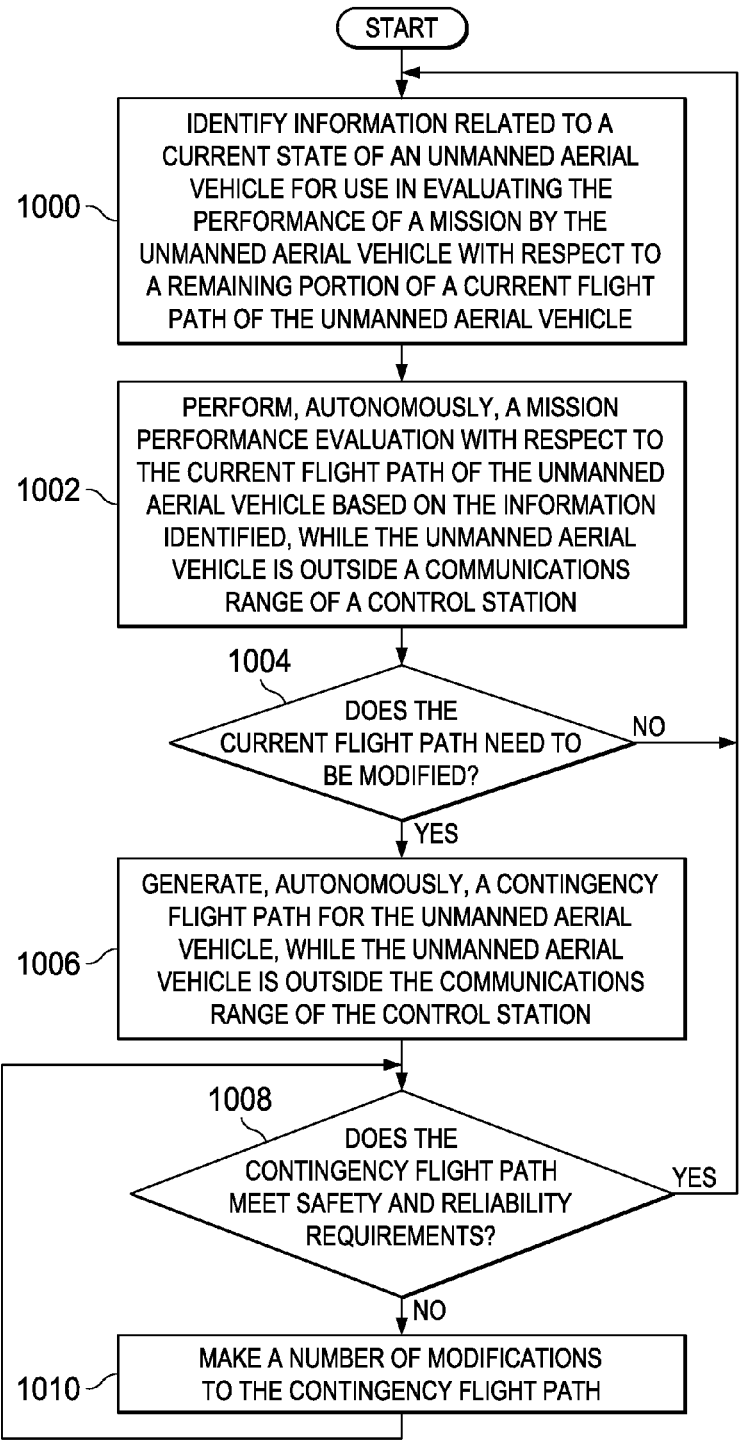
FIG. 10 is an illustration of a process for autonomously managing a flight path of an unmanned aerial vehicle in the form of a flowchart in accordance with an illustrative embodiment.

With reference now to FIG. 10, an illustration of a process for autonomously managing a flight path of an unmanned aerial vehicle is depicted in the form of a flowchart in accordance with an illustrative embodiment. The process illustrated in FIG. 10 may be implemented using, for example, computer system 224 described in FIGS. 2-5. In particular, at least a portion of this process may be implemented using at least one of mission manager 236 described in FIGS. 2 and 5, anomaly manager 232 described in FIGS. 2, 3, and 5, or autonomy interface 238 described in FIGS. 2 and 5.

The process may begin by identifying information related to a current state of an unmanned aerial vehicle for use in evaluating the performance of a mission by the unmanned aerial vehicle with respect to a remaining portion of a current flight path of the unmanned aerial vehicle (operation 1000). In operation 1000, the information identified may include, for example, without limitation, at least one of safety standards information, information about the detection of any anomalies that may affect the safety of the unmanned aerial vehicle, information about the terrain currently below and that will later be below the unmanned aerial vehicle, information about no-fly zones, information about the dynamics of the unmanned aerial vehicle, weather information, information about other aerial vehicles near the current location of the unmanned aerial vehicle, or other types of information.

Next, a mission performance evaluation may be autonomously performed with respect to the current flight path of the unmanned aerial vehicle based on the information identified, while the unmanned aerial vehicle is outside a communications range of a control station (operation 1002). A determination may be made as to whether the current flight path needs to be modified (operation 1004).

If the current flight path does not need to be modified, the process returns to operation 1000 described above. Otherwise, if the current flight path needs to be modified, a contingency flight path is autonomously generated for the unmanned aerial vehicle, while the unmanned aerial vehicle is outside the communications range of the control station (operation 1006). In operation 1006, the contingency flight path may have one or more contingency waypoints that may add to the waypoints of the current flight path, replace one or more waypoints of the current flight path, or both.

Next, a determination may be made as to whether the contingency flight path meets safety and reliability requirements (operation 1008). If the contingency flight path does not meet safety and reliability requirements, a number of modifications are made to the contingency flight path (operation 1010), with the process returning to operation 1008 described above. Otherwise, if the contingency flight path does meet safety and reliability requirements, the process returns to operation 1000 described above.

While the processes described in FIGS. 6-10 are described with respect to a single unmanned aerial vehicle, these processes may be performed for a plurality of unmanned aerial vehicles. As one illustrative example, a computer system onboard a primary unmanned aerial vehicle that is outside a communications range of a control station may receive and process data from multiple unmanned aerial vehicles, all of which may also be outside the communications range of the control station. The computer system may evaluate operations performed by, performance of, and flight path for each of these multiple unmanned aerial vehicles and determine whether actions need to be command. The computer system may autonomously generate and send commands for performing these actions to the various unmanned aerial vehicles while all of the unmanned aerial vehicles are still outside the communications range of the control station.

In this manner, the control, management, and decision-making that would typically be performed at a control station may be extended beyond the communications range of the control station using the primary unmanned aerial vehicle. In some illustrative examples, a plurality of unmanned aerial vehicles that are outside the communications range of the control station may form a communications network between themselves, which may be used for receiving and transmitting data. In this manner, the plurality of unmanned aerial vehicles may collaboratively work together to autonomously control, manage, and make decisions regarding their collective missions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
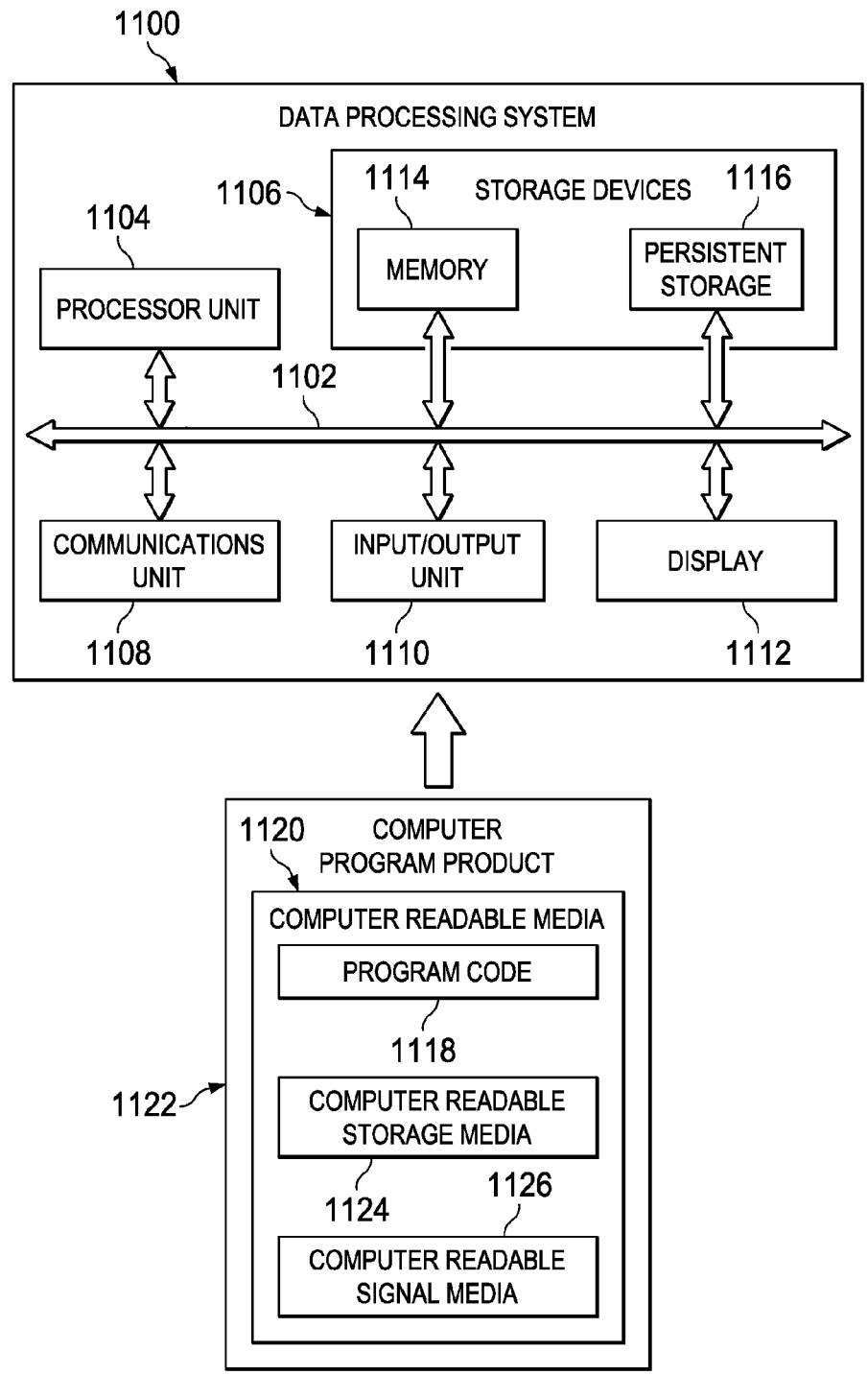
FIG. 11 is an illustration of a data processing system in the form of a block diagram in accordance with an illustrative embodiment.

Turning now to FIG. 11, an illustration of a data processing system is depicted in the form of a block diagram in accordance with an illustrative embodiment. Data processing system 1100 may be used to implement computer system 224 in FIG. 2. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   flying an unmanned aerial vehicle along a flight path from a control station at a first location to an area of interest at a second location and back to the control station, wherein the second location is outside a communications range of the control station;
   receiving, by a computer system located onboard the unmanned aerial vehicle, sensor data generated by sensors located onboard the unmanned aerial vehicle;
   processing, by the computer system, the sensor data using at least one of image edge detection, object recognition, object motion detection, and object shape detection to generate information of interest related to at least one target, while the unmanned aerial vehicle is outside the communications range of the control station, wherein processing the sensor data comprises:
   performing, by the computer system autonomously, a mission performance evaluation for the unmanned aerial vehicle with respect to the flight path of the unmanned aerial vehicle;
   identifying, by the computer system, a number of actions to be performed based on the information of interest related to the at least one target, while the unmanned aerial vehicle is outside the communications range of the control station, wherein the number of actions include at least one of flying the unmanned aerial vehicle closer to the at least one target and storing information about the at least one target for future transmission to the control station; and
   communicating the information of interest to the control station when the unmanned aerial vehicle is within the communications range of the control station.

2. The method of claim 1, wherein processing the sensor data comprises:
   performing, by the computer system autonomously, an imaging system performance evaluation for a number of imaging systems using the sensor data, wherein the sensor data includes at least one of imaging data generated by the number of imaging systems and system data about the number of imaging systems.

3. The method of claim 2, wherein identifying the number of actions comprises:
   identifying, by the computer system autonomously, the number of actions to be performed based on the imaging system performance evaluation and decision-making information stored in a data storage.

4. The method of claim 1, wherein processing the sensor data comprises:
   performing, by the computer system autonomously, a vehicle evaluation for the unmanned aerial vehicle using the sensor data, data received from a number of vehicle systems onboard the unmanned aerial vehicle, and tolerance information for a number of operational parameters for the unmanned aerial vehicle, while the unmanned aerial vehicle is outside the communications range of the control station.

5. The method of claim 4, wherein processing the sensor data further comprises: detecting, by the computer system autonomously, a set of anomalies based on the vehicle evaluation, while the unmanned aerial vehicle is outside the communications range of the control station.

6. The method of claim 5, wherein identifying the number of actions comprises:
   identifying, by the computer system autonomously, the number of actions to be performed based on the set of anomalies detected, while the unmanned aerial vehicle is outside the communications range of the control station.

7. The method of claim 1, wherein identifying the number of actions comprises:
   retrieving, by the computer system, safety standards information stored in a database implemented on the computer system; and
   identifying, by the computer system autonomously, the number of actions to be performed based on the information of interest related to the at least one target and the safety standards information, while the unmanned aerial vehicle is outside the communications range of the control station.

8. The method of claim 1 further comprising:
   receiving from the control station, prior to the unmanned aerial vehicle going outside the communications range of the control station, a set of preselected options from which at least one of the number of actions is to be selected.

9. The method of claim 1, wherein processing the sensor data comprises:
   performing, by the computer system autonomously, a mission performance evaluation for the unmanned aerial vehicle with respect to the flight path of the unmanned aerial vehicle.

10. The method of claim 9, wherein performing the mission performance evaluation comprises:
    performing, by the computer system autonomously, the mission performance evaluation using at least one of safety standards information, information about a detection of any anomalies that affect safety of the unmanned aerial vehicle, information about terrain, information about no-fly zones, information about dynamics of the unmanned aerial vehicle, weather information, or information about other aerial vehicles near a current location of the unmanned aerial vehicle.

11. The method of claim 9, wherein identifying the number of actions comprises: determining, by the computer system autonomously, whether a contingency flight path is needed based on the mission performance evaluation; and
    generating, by the computer system autonomously, the contingency flight path, while the unmanned aerial vehicle is outside communications range of the control station.

12. An apparatus comprising:
    an unmanned aerial vehicle configured to follow a flight path to perform a mission over an area of interest, where the flight path includes flying from a control station at a first location to an area of interest at a second location and back to the control station;
    a sensor system that is located onboard the unmanned aerial vehicle and that generates sensor data; and
    a computer system that is located onboard the unmanned aerial vehicle and that receives the sensor data, processes the sensor data using at least one of image edge detection, object recognition, object motion detection, and object shape detection to generate information of interest related to at least one target, and identifies a number of actions to be performed based on the information of interest related to the at least one target, while the unmanned aerial vehicle is located outside a communications range of the control station, wherein the number of actions include flying the unmanned aerial vehicle closer to the at least one target and storing the information of interest for future transmission to the control station, wherein processing the sensor data comprises performing, by the computer system autonomously, a mission performance evaluation for the unmanned aerial vehicle with respect to the flight path of the unmanned aerial vehicle, and wherein the computer system is configured to communicate the information of interest to the control station once the unmanned aerial vehicle is within the communications range of the control station.

13. The apparatus of claim 12, wherein the computer system is configured to autonomously process the sensor data and identify the number of actions to be performed autonomously, while the unmanned aerial vehicle is located outside the communications range of the control station.

14. The apparatus of claim 12, wherein the computer system comprises:
an autonomy interface that autonomously checks the information of interest for reliability.

15. The apparatus of claim 12, wherein the computer system comprises:
an anomaly manager that autonomously performs a vehicle evaluation for the unmanned aerial vehicle, identifies a set of anomalies based on the vehicle evaluation, and identifies the number of actions to be performed based on the set of anomalies identified.

16. The apparatus of claim 12, wherein the sensor system includes a number of imaging systems and wherein the computer system comprises:
an adaptive sensor controller that autonomously performs an imaging system performance evaluation for the number of imaging systems and identifies the number of actions to be performed based on the imaging system performance evaluation; and
a mission manager that autonomously performs a mission performance evaluation and identifies a contingency flight path for the unmanned aerial vehicle based on the mission performance evaluation.

17. The method of claim 1, further comprising:
identifying, by the computer system, that the at least one target has been detected and that a number of pixels in an image representing the at least one target is less than a selected number;
increasing, in response to identifying the number of pixels is less than the selected number, a zoom setting on an imaging system attached to the unmanned aerial vehicle to have a zoomed-in field of view; and
determining, by the computer system, that the unmanned aerial vehicle needs to plan and fly a flight path that keeps the at least one target within the zoomed-in field of view of the imaging system.

18. A method comprising:
flying an unmanned aerial vehicle along a flight path from a control station at a first location to an area of interest at a second location and back to the control station, wherein the second location is outside a communications range of the control station;
receiving, by a computer system located onboard the unmanned aerial vehicle, sensor data generated by sensors located onboard the unmanned aerial vehicle;
processing, by the computer system, the sensor data using at least one of image edge detection, object recognition, object motion detection, and object shape detection to generate information of interest related to at least one target, while the unmanned aerial vehicle is outside the communications range of the control station;
identifying, by the computer system, a number of actions to be performed based on the information of interest related to the at least one target, while the unmanned aerial vehicle is outside the communications range of the control station, wherein the number of actions include at least one of flying the unmanned aerial vehicle closer to the at least one target and storing information about the at least one target for future transmission to the control station, whereby the unmanned aerial vehicle extends beyond the communications range of the control station such that the at least one target is tracked even when the at least one target is in a contested or restricted area of interest; and
communicating the information of interest to the control station when the unmanned aerial vehicle is within the communications range of the control station.

* * * * *